(12) United States Patent
Kirjavainen

(10) Patent No.: US 7,124,970 B2
(45) Date of Patent: Oct. 24, 2006

(54) METHOD AND APPARATUS FOR PROCESSING VARIOUS MATERIALS

(75) Inventor: Kari Kirjavainen, Tampere (FI)

(73) Assignee: Conenor OY, Tampere (FI)

( * ) Notice: Subject to any disclaimer, the term of this patent is extended or adjusted under 35 U.S.C. 154(b) by 0 days.

(21) Appl. No.: 10/482,192

(22) PCT Filed: Jun. 24, 2002

(86) PCT No.: PCT/FI02/00552

§ 371 (c)(1),
(2), (4) Date: Dec. 29, 2003

(87) PCT Pub. No.: WO03/000393

PCT Pub. Date: Jan. 3, 2003

(65) Prior Publication Data

US 2004/0159971 A1    Aug. 19, 2004

(30) Foreign Application Priority Data

Jun. 25, 2001  (FI)  .................................. 20011348

(51) Int. Cl.
B29C 47/38 (2006.01)
F16L 11/00 (2006.01)

(52) U.S. Cl. ........................ 241/261.1; 241/14; 241/23; 241/245; 138/125; 138/137; 264/126; 264/211.21; 264/269

(58) Field of Classification Search ................ 241/244, 241/245, 257.1, 261.1, 14, 23; 138/125, 138/137; 264/126, 211.21, 269
See application file for complete search history.

(56) References Cited

U.S. PATENT DOCUMENTS

| 3,922,131 | A | | 11/1975 | Stegmeier |
| 4,883,363 | A | | 11/1989 | Pillon et al. |
| 5,130,352 | A | * | 7/1992 | Chow ........................... 524/13 |
| 5,516,472 | A | * | 5/1996 | Laver ........................... 264/118 |
| 6,073,657 | A | * | 6/2000 | Hippelainen et al. ....... 138/125 |

FOREIGN PATENT DOCUMENTS

| DE | 42 10 317 | 10/1992 |
| EP | 0 490 017 | 6/1992 |
| EP | 0 853 981 | 7/1998 |
| FI | 179474 | 6/1974 |
| FI | 892833 | 12/1990 |
| FI | 96493 | 3/1996 |
| RU | 2049550 | 12/1995 |
| RU | 2157732 | 11/1998 |
| SU | 633579 | 5/1977 |
| WO | 97/37830 | 10/1997 |

OTHER PUBLICATIONS

Funke, H.: Hola-Zentr. (Aug. 20, 1976, vol. 102 no, No. 100, pp. 1349-1351. (English language Abstract provided).

* cited by examiner

*Primary Examiner*—Derris H. Banks
*Assistant Examiner*—Jason Y. Pahng
(74) *Attorney, Agent, or Firm*—Young & Thompson

(57) ABSTRACT

The invention relates to a method and a an apparatus for processing various materials, the apparatus including at least two annular feed gaps placed one within the other. The beginning of each feed gap is provided with a grinding section (5), which is followed in the apparatus by a mixing section (10). The materials are processed in the grinding section (5), whereafter they are mixed in the mixing section (10), and the mixture is extruded into a product.

8 Claims, 1 Drawing Sheet

METHOD AND APPARATUS FOR PROCESSING VARIOUS MATERIALS

BACKGROUND OF THE INVENTION

The invention relates to a method for processing various materials, the method including grinding at least one material, mixing the material with another material and extruding the mixture of materials into a product.

The invention further relates to an apparatus for processing material, including at least two annular feed gaps placed one within the other.

RU 2,049,550 discloses a grinder comprising a conical rotor and a conical stator. This apparatus is able to grind input material, but the ground material requires further processing to provide an actual product.

U.S. Pat. No. 5,624,616 discloses a method for making fibre products. In this arrangement, wood and a polymer are mixed at a high temperature and pressure in order to soften the wood lignin. However, this arrangement is rather complicated and difficult to implement.

An objective of the present invention is to provide a method and an apparatus for efficient processing of material.

The method according to the invention is characterized by processing the materials simultaneously in an apparatus provided with a grinding section and a mixing section, so that at least in the grinding section the apparatus is provided with at least two annular feed gaps placed one within the other, and at least one material is ground in the feed gap, and mixing the materials in the mixing section of the apparatus after the grinding.

Further, the apparatus according to the invention for processing material is characterized in that the beginning of at least one feed gap is provided with a grinding section, which is followed in the apparatus by a mixing section for mixing together the materials that used to be in different feed gaps.

According to a basic idea of the invention, the apparatus comprises at least two annular feed gaps placed one within the other. The beginning of at least one feed gap is provided with a grinding section that can also be used for melting if the material is meltable. The grinding section is followed in the apparatus by a mixing section for mixing the materials that used to be in different feed gaps. The basic idea of a preferred embodiment is that the feed gaps are shaped like tapering cones in order to increase the pressure in the grinding section towards the end thereof. According to another preferred embodiment, the surfaces of the rotor and the stator situated on different sides of the feed gap in the grinding section are wavelike, and the grooves of the rotor and the stator are formed such that when the rotor groove is the deepest the stator groove is the shallowest and vice versa. According to a third preferred embodiment, the mixing section comprises, between the feed gaps, a rotor provided with openings for mixing together the materials in the different feed gaps. According to a fourth preferred embodiment, different materials are fed into different feed gaps, i.e. a non-melting material is supplied to the first feed gap and a material that melts in the grinding section is fed into the second feed gap, the materials being mixed in the mixing section so that the obtained mixture is sufficiently viscoelastic to be extrudable out of the apparatus. According to a fifth preferred embodiment, a wood material is fed into the first feed gap and ground, pulverized into fibres and simultaneously during grinding substantially dehydrated. A polymer is fed into the second feed gap, melted in the grinding section and mixed in the mixing section with the dry wood fibres, whereafter the mixture is extruded into a product.

The invention provides the advantage that one apparatus is sufficient to grind the material and to form an actual product. With conical feed gaps it is possible to increase the pressure in the grinding section, so that the apparatus can be used e.g. to dehydrate the material to be ground. When the surfaces of the rotor and the stator located on different sides of the feed gap are wavelike and the rotor and stator grooves are formed such that the rotor groove is the deepest when the stator groove is the shallowest and vice versa, the structure provides highly efficient grinding and shearing of the material between the rotor and the stator. The apparatus enables efficient processing of non-melting material and melt material simultaneously supplied thereto, thus providing various products with good properties. The grinding section can also be followed by a decompression zone, where the rest of the moisture, which is e.g. in the form of steam or some other gas, can be discharged from the apparatus via openings provided in the stator.

BRIEF DESCRIPTION OF THE DRAWINGS

The invention will be described below in more detail with reference to the accompanying FIGURE that shows schematically a cross-sectional side view of an apparatus according to the invention.

DESCRIPTION OF THE PREFERRED EMBODIMENT

Figure 1:
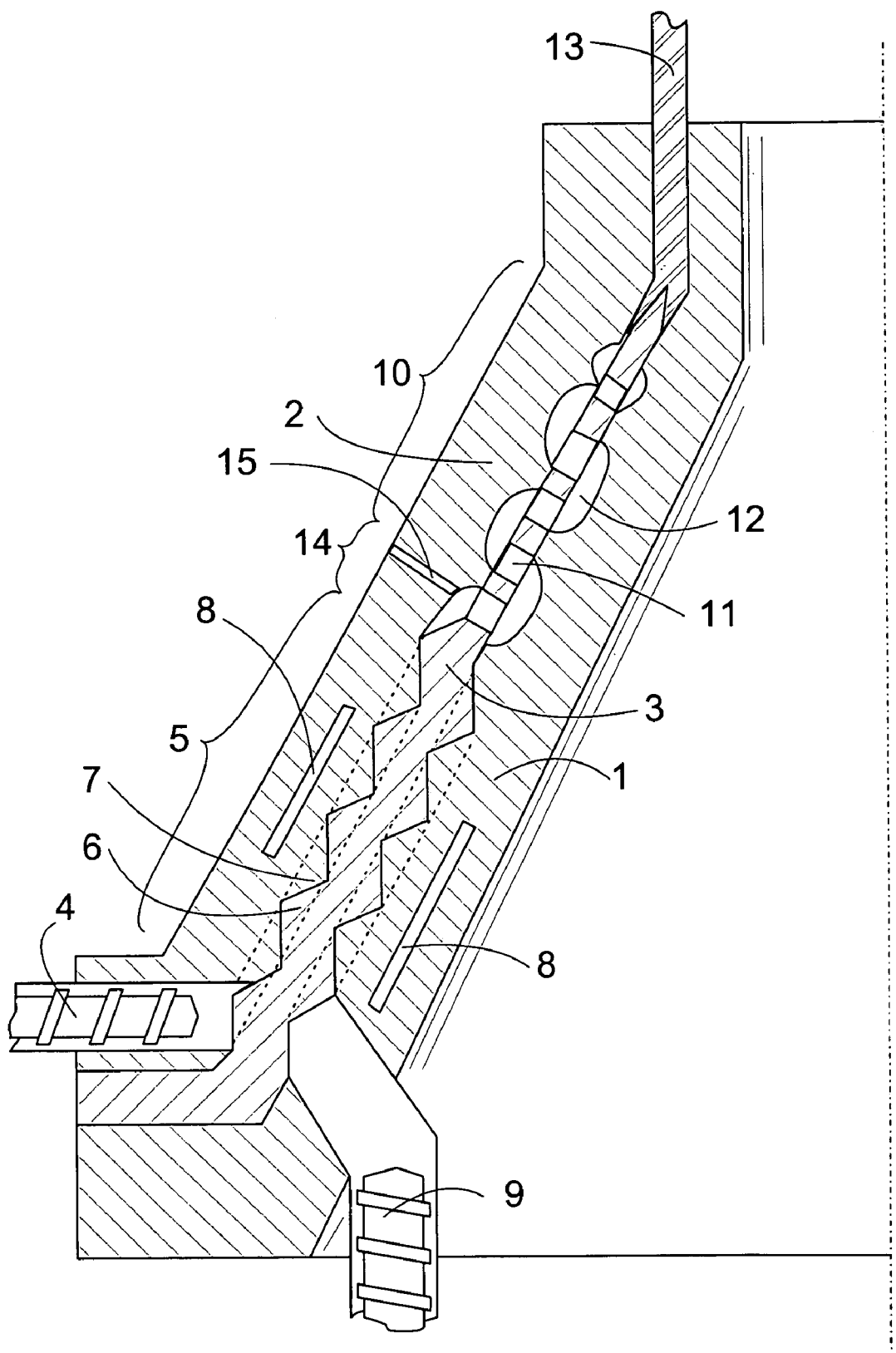

The apparatus for processing material shown in the FIGURE comprises a conical inner stator 1, a conical outer stator 2 and a conical rotor 3 between the stators. An annular tapering conical feed gap is provided between the outer stator 2 and the rotor 3, and a corresponding annular tapering conical feed gap is located between the inner stator 1 and the rotor 3.

The first material, which can be sawdust, wood chips or some other similar wood material, is fed by a first feeder 4 to the exterior of the rotor 3 into a feed gap between the rotor 3 and the outer stator 2. The beginning of the apparatus comprises a grinding section 5, where the first material is ground and pulverized into fibres. For example wood material can be ground and pulverized into fibres. In the grinding section 5, the material travels in grooves 6 of the rotor 3 and in grooves 7 of the stator 2. The surfaces of the rotor 3 and the stator 2 facing each other are wavelike, and the grooves 6 and 7 are formed such that when the rotor 3 groove 6 is the deepest the stator 2 groove is the shallowest and vice versa. As the material travels forward in the grinding section, substantially all of the material keeps moving between the rotor groove 6 and the stator groove 7. In moving between the rotor and the stator grooves, the material is sheared and ground in the interspace. During the grinding, the material warms up due to heat resulting from friction, and the material can be further heated with heating means, such as an electrical resistor 8.

The material to be ground can be heated to a temperature above the boiling point of water. If the material to be ground includes water, the water vaporizes and a steam pressure is thus formed in the grinding section 5. Due to the conical structure, the pressure in the grinding section 5 increases upwards in the FIGURE. The steam therefore condenses since the pressure drops when moving downwards in the rotor in the FIGURE, and the steam thus tends to be discharged backwards and it condenses into liquid at a lower pressure and temperature, the liquid flowing away from the base of the rotor. The condensed steam flows downwards in the FIGURE, wherefore the material to be ground at the end of the grinding section is rather dry. The condensed steam is able to flow downwards in the FIGURE also because the particles of the material to be ground are usually rather large at the beginning of the grinding section, and flow is thus possible between the particles. Therefore, the grinding section 5 enables simple grinding and simultaneous drying of the material to be ground.

A second feeder 9 is used to supply a second material, for example a plastic polymer such as polyethylene PE, to the interior of the rotor 3 into a feed gap between the rotor 3 and the inner stator 1. The material fed to the interior is processed in a similar grinding section as the material fed to the exterior. If the material fed to the interior is a melting material, such as a plastic polymer, it can be ground and melted in the grinding section.

After the grinding section 5, the materials supplied to different feed gaps are mixed in a mixing section 10. In the mixing section 10, the rotor 3 is provided with openings 11. Furthermore, the stators 1 and 2 are provided with non-continuous spiral grooves 12 that force the material to travel back and forth through the rotor openings, thus moving the material towards a nozzle section. Thus, the grooves 12 are spiral but non-continuous. The openings 11 and the grooves 12 overlap, so that the materials fed into different sides of the rotor 3 are efficiently mixed in the mixing section 10. The properties of at least one of the materials fed into the apparatus must provide sufficient viscoelasticity of the mixture so that the mixture can be extruded out of the apparatus into a product 13. The product 13 can be e.g. a sheet, a plank, a profile product or some other suitable end product.

Between the grinding section 5 and the mixing section 10 there can be a decompression zone 14, where the final moisture, such as steam in the material or some other gas contained in the apparatus can be discharged from the apparatus via openings 15 provided in the outer stator 2. If desired, the inner stator 1 can also be provided with openings for discharging the gas pressure.

The first material can consist e.g. of a wood material, such as wood chips or sawdust, which is ground and pulverized into fibres in the grinding section and simultaneously heated into a temperature of over 200° C., for instance. In the grinding section, the wood material is substantially dehydrated. The wood fibre is mixed with a polymer, such as polyethylene PE. The proportion of the polymer in the final product can vary e.g. between 5 and 10%. The polymer can be e.g. polyethylene PE or most preferably a mixture of polyethylene PE and pine oil. Due to the pine oil the polymer adheres efficiently to the wood fibre. The polyethylene plastic can be e.g. recycled polyethylene, and the pine oil is obtained as a residual product from the wood-processing industry. The wood material can also consist of a residual product, such as sawdust, which means that the raw materials of the product 13 are rather inexpensive. The operating characteristics, resistance to moisture and structural strength of the product 13 can be made equal to those of pressure-treated wood, for example.

The FIGURE and the related description are only intended to illustrate the inventive idea. The details of the invention can vary within the scope of the claims. For example, various materials, some of which can be non-melting and grindable materials and some melting materials, can be fed into the same feed gap in the grinding section 5. For instance, different types of residual plastics, e.g. non-melting cross-linked polyethylene PEX and melting polyolefin, such as polyethylene PE, can be supplied to the apparatus. Thus, the final product 13 can consist entirely or partially of residual plastics. Not all the initial parts of the feed gaps in the apparatus are required to form the grinding section, but a feed gap can also be provided with conventional direct spiral grooves that move the material forward and process it so that the melting material melts. The product 13 to be prepared can also be a pipe that is made of plastic either partly or in full. The pipe is applicable as a cable duct or in some other suitable use.

The invention claimed is:

1. A method for processing various materials, the method comprising the steps of:
   providing an apparatus comprising a grinding section and a mixing section so that at least in the grinding section the apparatus comprises at least two annular feed gaps placed one within the other defining a first feed gap and a second feed gap,
   feeding at least two different materials into the feed gaps so that a non-melting material is fed into the first feed gap and a material that melts during processing is fed into the second feed gap,
   grinding the non-melting material in the first feed gap and, simultaneously during the grinding, dehydrating the non-melting material in the first feed gap,
   melting the material during processing in the second feed gap,
   mixing the ground material with the melted material in the mixing section of the apparatus after the grinding and the melting, and
   extruding the mixture of the materials into a product, wherein the non-melting material is ground and dehydrated in the same apparatus in which the materials are mixed.

2. A method according to claim 1, wherein, mixing the materials in the mixing section provides a mixture that is sufficiently viscoelastic to be extrudable out of the apparatus.

3. A method according to claim 1, wherein, the non-melting material is a wood material that is ground and pulverized into fibres and simultaneously during grinding substantially dehydrated.

4. A method according to claim 3, comprising feeding, into the second feed gap, a polymer that is melted, and mixing the dry wood fibres with the polymer in the mixing section, and extruding the mixture into a product.

5. A method according to claim 4, comprising feeding pine oil into the second feed gap in addition to the polymer.

6. A method according to claim 4, wherein the polymer is polyethylene PE.

7. A method according to claim 4, wherein the proportion of the polymer in the final product is less than 10%.

8. A method according to claim 1, wherein the apparatus comprises a decompression zone located between the grinding section and the mixing section, gas being discharged from the apparatus in the decompression zone.

* * * * *